United States Patent
Kraus et al.

(10) Patent No.: US 10,913,171 B2
(45) Date of Patent: Feb. 9, 2021

(54) ELECTRIC APPLIANCE FOR PERSONAL CARE

(71) Applicant: Braun GmbH, Kronberg (DE)

(72) Inventors: Bernhard Kraus, Braunfels (DE); Thomas Verstege, Frankfurt am Main (DE); Uwe Schober, Glashuetten (DE); Frank Ziegler, Karben (DE)

(73) Assignee: Braun GMBH, Kronberg (DE)

( * ) Notice: Subject to any disclaimer, the term of this patent is extended or adjusted under 35 U.S.C. 154(b) by 0 days.

(21) Appl. No.: 15/950,572

(22) Filed: Apr. 11, 2018

(65) Prior Publication Data

US 2018/0311842 A1    Nov. 1, 2018

(30) Foreign Application Priority Data

Apr. 27, 2017  (EP) .................................... 17168473

(51) Int. Cl.
| | |
|---|---|
| *H02K 7/14* | (2006.01) |
| *H02K 33/00* | (2006.01) |
| *H02K 33/02* | (2006.01) |
| *B26B 19/28* | (2006.01) |
| *B26B 19/04* | (2006.01) |
| *B26B 19/06* | (2006.01) |
| *B26B 19/38* | (2006.01) |

(52) U.S. Cl.
CPC .......... *B26B 19/282* (2013.01); *H02K 7/145* (2013.01); *H02K 33/00* (2013.01); *H02K 33/02* (2013.01); *B26B 19/042* (2013.01); *B26B 19/063* (2013.01); *B26B 19/3873* (2013.01)

(58) Field of Classification Search
CPC . B26B 19/282; B26B 19/3873; B26B 19/063; B26B 19/042; H02K 33/00; H02K 33/02; H02K 7/145
USPC ............................................... 310/15, 36, 50
See application file for complete search history.

(56) References Cited

U.S. PATENT DOCUMENTS

| | | | | |
|---|---|---|---|---|
| 3,749,951 | A | * | 7/1973 | Artin ....................... B26B 19/02 310/73 |
| 3,800,172 | A | * | 3/1974 | Artin ..................... B26B 19/282 310/50 |
| 4,156,882 | A | | 5/1979 | Delagi et al. |

(Continued)

FOREIGN PATENT DOCUMENTS

| | | | |
|---|---|---|---|
| EP | 674979 | B1 | 11/1997 |
| EP | 1548917 | B1 | 5/2010 |

(Continued)

OTHER PUBLICATIONS

European search report dated Nov. 9, 2017.

(Continued)

*Primary Examiner* — John K Kim
(74) *Attorney, Agent, or Firm* — Kevin C. Johnson

(57) ABSTRACT

The present invention relates to electric appliances for personal care, in particular electric shavers, comprising a magnetic linear drive unit having first and second drive components supported for linear displacement relative to each other by a first spring device and adapted to magnetically interact with each other, and a second spring device for movably linking the drive unit to a structural element of the appliance. The first spring device is made from plastics such as long-chained PPS, whereas the second spring device is made from steel.

17 Claims, 5 Drawing Sheets

(56) References Cited

U.S. PATENT DOCUMENTS

| | | | |
|---|---|---|---|
| 4,240,200 | A | 12/1980 | Bukoschek |
| 5,559,378 | A | 9/1996 | Oudet et al. |
| 5,632,087 | A | 5/1997 | Motohashi et al. |
| 7,053,507 | B2 | 5/2006 | Kobayashi et al. |
| 7,304,407 | B2 | 12/2007 | Sanematsu et al. |
| 7,334,338 | B2 | 2/2008 | Shiba et al. |
| 7,841,090 | B2 | 11/2010 | Eichhorn et al. |
| 8,304,938 | B2 * | 11/2012 | Jungnickel ............ F16F 1/027 310/36 |
| 8,373,315 | B2 | 2/2013 | Kobayashi et al. |
| 8,464,429 | B2 * | 6/2013 | Haczek ............... B26B 19/386 30/50 |
| 8,525,373 | B2 * | 9/2013 | Jungnickel ......... A61C 17/3418 310/36 |
| 8,731,186 | B1 | 5/2014 | Hadad |
| 8,806,756 | B2 * | 8/2014 | Kraus ................. B26B 19/282 30/43.3 |
| 9,127,366 | B2 | 9/2015 | Matsuda et al. |
| 9,768,675 | B2 * | 9/2017 | Andrikowich .......... H02K 7/14 |
| 10,792,825 | B2 * | 10/2020 | Kraus .................... H02K 33/04 |
| 2002/0134484 | A1 | 9/2002 | Erb, Jr. |
| 2002/0175239 | A1 * | 11/2002 | Momoi ............... G11B 23/107 242/348 |
| 2007/0035860 | A1 | 2/2007 | Adachi et al. |
| 2008/0130169 | A1 | 6/2008 | Kitamura |
| 2009/0025229 | A1 | 1/2009 | Kappes et al. |
| 2009/0165305 | A1 * | 7/2009 | Kraus .................. B26B 19/282 30/43.7 |
| 2009/0211101 | A1 | 8/2009 | Azar et al. |
| 2012/0102751 | A1 * | 5/2012 | Haczek ................. B26B 19/02 30/42 |
| 2012/0125699 | A1 | 5/2012 | Guthrie |
| 2014/0054980 | A1 * | 2/2014 | Andrikowich .......... H02K 7/14 310/12.31 |
| 2015/0097322 | A1 | 4/2015 | Rarey et al. |
| 2015/0145187 | A1 | 5/2015 | Soles et al. |
| 2015/0249893 | A1 | 9/2015 | Broberg et al. |
| 2016/0120330 | A1 | 5/2016 | Defranks et al. |
| 2016/0176059 | A1 * | 6/2016 | Ring ........................ H02K 7/14 310/38 |
| 2016/0181901 | A1 * | 6/2016 | Kraus .................. B26B 19/282 310/36 |
| 2016/0250760 | A1 * | 9/2016 | Phoon .................. B26B 21/521 30/277.4 |
| 2017/0341246 | A1 * | 11/2017 | Phoon .................. B26B 19/386 |
| 2018/0311841 | A1 | 11/2018 | Kraus et al. |
| 2018/0311842 | A1 * | 11/2018 | Kraus .................... H02K 33/00 |
| 2018/0311843 | A1 | 11/2018 | Kraus et al. |
| 2018/0319028 | A1 | 11/2018 | Kraus et al. |

FOREIGN PATENT DOCUMENTS

| | | |
|---|---|---|
| EP | 3038242 A1 | 6/2016 |
| GB | 2014372 A | 8/1979 |
| JP | H06089008 A | 3/1994 |
| JP | H09065634 A | 3/1997 |
| JP | 2000295833 | 10/2000 |
| JP | 2005354879 | 12/2005 |
| JP | 4487650 B2 | 6/2010 |
| WO | 03103905 A1 | 12/2003 |
| WO | 2008009322 A1 | 1/2008 |

OTHER PUBLICATIONS

European Search Opinion and Report; EP Application No. 17168466.5; dated Nov. 3, 2017; European Patent Office.

European Search Opinion and Report; EP Application No. 17168469.9; dated Oct. 27, 2017; European Patent Office.

European Search Opinion and Report; EP Application No. 17168474.9; dated Nov. 8, 2017; European Patent Office.

Written Opinion of the International Searching Authority; International Application No. PCT/IB2018/0052503; dated Nov. 1, 2018; European Patent Office; Munich, Germany.

Written Opinion of the International Searching Authority; International Application No. PCT/IB2018/052502; dated Nov. 1, 2018; European Patent Office; Munich, Germany.

Written Opinion of the International Searching Authority; International Application No. PCT/IB2018/052507; dated Nov. 1, 2018; European Patent Office; Munich, Germany.

Written Opinion of the International Searching Authority; International Application No. PCT/IB2018/052506; dated Nov. 1, 2018; European Patent Office; Munich, Germany.

Mullins, Burton S.; Final Office Action; U.S. Appl. No. 15/950,627; dated Mar. 20, 2020; United States Patent and Trademark Office; Alexandria, Virginia.

Mullins, Burton S.; Office Action; U.S. Appl. No. 15/950,627; dated Oct. 18, 2019; United States Patent and Trademark Office; Alexandria, Virginia.

https://www.stainless-steel-world.net/basicfacts/stainless-steel-and-its-families.html; Accessed Sep. 26, 2019 (Year: 2019).

https://en.wikipedia.org/wiki/Mu-metal; Accessed Sep. 26, 2019 (Year: 2019).

Dong, Liang; Final Office Action; U.S. Appl. No. 15/950,597; dated May 15, 2020; United States Patent and Trademark Office; Alexandria, Virginia.

Dong, Liang; Office Action; U.S. Appl. No. 15/950,597; dated Dec. 12, 2019; United States Patent and Trademark Office; Alexandria, Virginia.

Kim, John K.; Final Office Action; U.S. Appl. No. 15/950,657; dated Apr. 16, 2020; United States Patent and Trademark Office; Alexandria, Virginia.

Kim, John K.; Office Action; U.S. Appl. No. 15/950,657; dated Jan. 30, 2020; United States Patent and Trademark office; Alexandria, Virginia.

Notice of Reason for Refusal dated Nov. 30, 2020; Japanese Patent Application No. 2019-554892; Japanese Patent Office; Tokyo, Japan.

* cited by examiner

ELECTRIC APPLIANCE FOR PERSONAL CARE

FIELD OF THE INVENTION

The present invention relates to electric appliances for personal care, in particular electric shavers, comprising a magnetic linear drive unit having first and second drive components connected to each other by means of a first spring device for linear displacement relative to each other and adapted to magnetically interact with each other, and a second spring device movably linking the magnetic linear drive unit to a structural part of the electric appliance.

BACKGROUND OF THE INVENTION

Small sized electric appliances for personal care often include functional elements or working tools driven by an electric-type, more particularly magnetic-type drive unit which may be received within a housing element that may form a handpiece to be handheld or a tool head connected thereto.

For example, electric shavers may have one or more cutter elements driven by an electric drive unit in an oscillating manner where the cutter elements reciprocate under a shear foil, wherein such cutter elements or undercutters may have an elongated shape and may reciprocate along their longitudinal axis. Other types of electric shavers use rotatory cutter elements which may be driven in an oscillating or a continuous manner. The said electric drive may include an electric or magnetic type linear motor, wherein the drive unit may include an elongated drive transmitter for transmitting the driving motion of the motor to the cutter element.

Such drive systems include sometimes linear-type drive units comprising first and second drive components reciprocating or oscillating relative to each other in a substantially linear manner, i.e. substantially along linear axes, wherein the driving forces may result from magnetic fields. Said drive components usually form the active parts of the linear electric motor and are configured to provide for the driving forces due to magnetic interaction with each other. For example, one of the drive components may include a permanent magnet, whereas another one of the drive components may include one or more magnetic coils to which pulsating electric current is applied to create pulsating magnetic fields, thereby causing the two drive components to oscillate relative to each other. Thus, said drive components are usually different from driven parts of the electric appliance such as the tools to be driven or transmitter parts driven by the linear motor and driving said tools. More particularly, at least one of said drive components may be connected to a tool of the electric appliance such as an undercutter or a shaver or a brush carrier of a toothbrush so as to drive said tool. At least one of the drive components connects to a transmission train transmitting the oscillating movement of the drive component onto the functional element to be driven such as the aforementioned cutter element, wherein such transmission train may include a transmitter pin directly connecting to the cutter element or indirectly connected thereto by means of a yielding bridge structure allowing for pivoting movements of the cutter element.

For example, US 2009/0025229 A1 or U.S. Pat. No. 7,841,090 B2 discloses an electric shaver having a pair of cutter elements provided under a shear foil and driven in an oscillating manner. Furthermore, WO 03/103905 A1 and EP 0 674 979 A1 disclose linear oscillating drive units for shavers, wherein the drive components oscillating relative to each other in a linear manner include a permanent magnet on the one hand and a magnetic coil on the other hand.

In such systems, one of the drive components may be rigidly connected to a mounting structure or the installation environment which is often a handpiece or a tool head formed by a housing part of the electric appliance in which the drive unit is received. For example, the permanent magnet may be rigidly supported or fixedly connected to an interior side of the handpiece via a drive carrier or a mounting structure connected thereto, whereas the other drive component including the magnetic coils may be movably supported on said drive carrier for allowing the linear oscillation, for example by means of a plastic spring device including leaf springs or c-shaped springs as shown by EP 15 48 917 B1.

Furthermore, WO 03/103905 A1 suggests to not fix one of the drive components, but to fix the linkage or pendulum bars linking the two drive components to each other, to the drive carrier and thus, to the installation environment in terms of an inner portion of the handpiece housing. Such fixing of the pendulum bearing to the drive carrier allows both drive units to oscillate in the direction of the oscillation axis in a sort of reverse motion. When a first drive component moves to the left, the other drive component moves to the right, and vice versa. Such reverse oscillation may reduce the aforementioned undesired vibrations of the handpiece.

However, due to tolerances of the drive components and/or phase offset, there may be mismatch of the dynamic effects of the reverse motions and thus, vibrations that can be felt in the hand holding the handpiece. Furthermore, due to restrictions of the oscillating amplitude of the drive components and restrictions in the mounting space, the cutter elements at the shaver head sometimes cannot be driven at the desired oscillation amplitude.

EP 3 038 242 A1 suggests a linear motor for a shaver with two separate spring devices, wherein a first spring device forms a resonance spring connecting the two drive components of the drive unit to each other and a second spring device forms a suspension spring connecting the drive unit to a mounting structure fixed to the shaver's housing forming the handle thereof. Due to such second spring device, the entire drive unit may move relative to the shaver's handle, thereby reducing transmission of vibrations onto the handle.

Such multiple spring devices may help in keeping vibrations away from the handle. However, it is rather difficult to achieve an efficient transmission of the oscillation to the working tool with large amplitudes and stable frequency, but still allow for a simple structure of the spring device system and efficient mounting and manufacturing thereof. More particularly, in order to achieve stable operation at the desired frequencies with stable amplitudes, the spring system needs to have a high stiffness what implies certain restrictions onto the material and dimensions of the spring elements and the connections between the spring elements and the components linked thereto.

SUMMARY OF THE INVENTION

It is an objective underlying the present invention to provide for an improved electric appliance for personal care avoiding at least one of the disadvantages of the prior art and/or further developing the existing solutions. A more particular objective underlying the invention is to provide for an improved drive unit with a simple structure that can be easily manufactured and mounted, but still achieves high driving performance.

More particularly, an improved spring structure for the drive unit is desired to provide for sufficient stiffness to allow for efficient transmission of oscillations without sacrificing easy mounting and manufacturing.

A still further objective is to allow for less restrictions on design of the drive unit structure without reducing performance characteristics such as stable oscillation frequencies, sufficient amplitudes and low vibrations. Another objective is to avoid complicated mounting structures and to allow for efficient installation of the drive unit into housing elements forming handpieces without requiring additional space or redesigning established ergonomic housings.

To achieve at least one of the aforementioned objectives, the multiple spring system of the drive unit includes spring elements made of different materials to achieve sufficient stiffness and rigidity where needed and, on the other hand, provide for design freedom and easy mounting where possible. More particularly, mixing metal and plastic spring elements achieves a sufficiently stiff and rigid support for the drive components in combination with integration of a mounting structure into the spring elements to achieve easy mounting and reducing the number of elements.

More particularly, the first spring device movably connecting the first and second drive components of the drive unit to each other is made from plastic, whereas the second spring device movably linking the magnetic linear drive unit to a further structural part of the electric appliance is made from metal such as steel.

These and other advantages become more apparent from the following description giving reference to the drawings and possible examples.

DETAILED DESCRIPTION OF THE INVENTION

Figure 1:
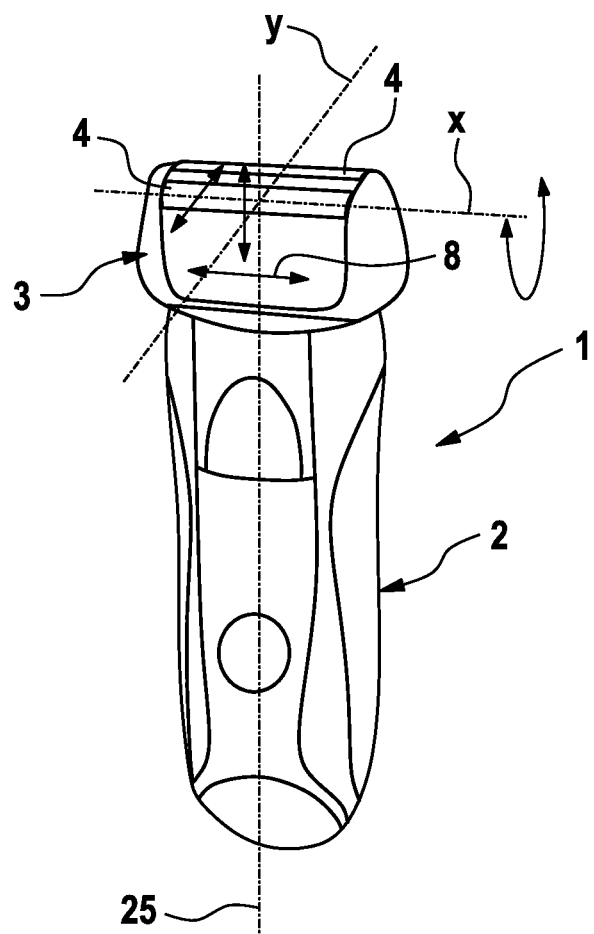
FIG. 1: is a perspective partial view of a small-sized electric appliance for personal care in terms of an electric shaver having a shaver head including two cutter elements drivable in an oscillating manner by a linear type drive unit received within the shaver housing forming the shaver's handpiece.

In order to achieve a sufficiently rigid and stiff drive unit structure that can be easily manufactured and mounted within the restricted space of a personal appliance's housing, it is suggested the first spring device movably connecting the two drive components of the drive unit to each other includes one or more spring elements made from plastics, whereas the second spring device movably linking the drive unit to a structural component of the appliance includes one or more spring elements made from metal.

The first spring device made of plastics may include mounting structures for easily connecting the first and second drive components to the one or more spring elements made of plastics, thereby allowing for easy mounting. The second spring device including at least one metal spring element provides for sufficient rigidity and stiffness of the drive unit structure, thereby achieving efficient transmission of oscillation with stable amplitudes and desired frequencies.

Said first spring device may form a resonance spring allowing and helping the two drive components of the drive unit to oscillate at a natural frequency. More particularly, said first spring device may connect a magnetic coil device forming a first drive component to a permanent magnet device forming the second drive component to each other in a way movable relative to each other in a basically linear way.

Said second spring device may form a suspension spring device connecting said first or second drive component of the drive unit or another component of the drive unit to a mounting structure which mounting structure may be fixed to the appliance's housing or may be directly formed by the appliance's housing. Such suspension spring device formed by the second spring device may allow the entire drive unit to move relative to the mounting structure supporting the drive unit, wherein such mounting structure may be rigidly attached to or formed by the appliance's handle which may be formed by, for example, the shaver's housing or rigidly attached to or formed by the appliance's tool head.

The spring elements of the first and second spring devices may be formed as leaf springs which may extend along opposite sides of the drive unit and/or opposite sides of the first and second drive components thereof. More particularly, each spring element of both the first and second spring devices may consist of such leaf spring having an elongated, flattened, plate-like contour with a longitudinal axis extending substantially perpendicular or crosswise to the linear axis of movement of the drive unit.

More particularly, the leaf spring elements of the first and second spring devices may extend substantially parallel to each other along opposite sides of the drive unit, at least when the drive components of the drive unit are in a neutral, non-operative position.

In the alternative to such parallel spring configuration, the second spring device connecting the drive unit to the mounting structure may include a pair of leaf springs being arranged inclined relative to each other, in particular having a V-like arrangement, wherein such leaf springs are positioned on opposite sides of the drive unit so that the drive unit is connected to opposite sides of the mounting structure by means of a leaf spring on each side.

Such leaf springs on opposite sides of the drive unit may be arranged so that longitudinal axes going through the leaf springs in a neutral position of the drive unit with the drive components being inactive, define an acute angle, wherein such acute angle between the longitudinal axes of the leaf springs may range from 2×0.5° to 2×25° or from 2×0.5° to 2×10° or from 2×1° to 2×5°.

According to a further aspect, the first spring device may be configured to have a spring stiffness significantly higher than the spring stiffness of the second spring device. More particularly, the first spring device may be configured more than twice as stiff as the second spring device. More particularly, the stiffness of the first spring device may be chosen to range from five times to fifteen times or eight times to twelve times larger than the spring stiffness of the second spring device.

Although the first spring device is made from plastics and the second spring device is made from steel, said first and second spring devices are designed such that the first spring device has a significantly higher spring stiffness than the second spring device. So as to have such increased spring stiffness, the first spring device may include spring elements having an increased thickness and/or increased dimensions in comparison to the spring element of the second spring device. In the alternative or in addition, the first spring device may include a higher number of spring elements than the second spring device, wherein such multiple spring elements of the first spring device may be arranged to be effective in parallel to each other so that the individual spring stiffness of each spring element sum up to the entire spring stiffness of the first spring device.

For example, the second spring device may consist of two metal leaf springs, whereas the first spring device may include at least four plastic leaf springs.

Due to the aforementioned configuration of the spring stiffness of the first spring device being significantly higher than the spring stiffness of the second spring device, a stable oscillation with high amplitudes of the first spring device can be achieved and, at the same time, vibrations of the drive unit can be prevented from being transmitted to the structural component of the appliance to which the drive unit is linked by means of the second spring device.

So as to avoid negative influence of the first and second spring devices onto each other, the first spring device may be decoupled or uncoupled from the second spring device in terms of vibrations or oscillations of the spring elements of the first spring device being transmitted to the second spring device and/or vibrations or oscillations of the spring elements of the second spring device being transmitted onto the first spring device. Such oscillative or vibrative uncoupling of the first and second spring devices from each other, may be achieved by means of a vibration barrier between the first and second spring devices to prevent transmission of vibrations of the first spring device to the second spring device and vice versa. Such vibration barrier may include a rigid, stiff element separating the two spring devices from each other, wherein such rigid, stiff element may be formed from metal. More generally, such vibration barrier may include a separation element configured to resist stresses and forces implied by the vibrating spring elements substantially without being deformed or being moved.

For example, said vibration barrier may include a metal plate to which the second spring device is connected, which metal plate is, on the other hand, rigidly connected to one of the drive components which are connected relative to each other by means of the first spring device.

According to a further aspect, the first spring device made from plastics may include a spring element made from a high-performance thermoplastics such as polysulfone (PSU) or polyether ether ketone (PEEK) or a polyphenylene sulfide (PPS). In particular, a long-chain PPS may be used to form the spring elements of the first spring device.

According to a further aspect, the first spring device and the spring elements thereof may be formed as a part of a closed ring element which may be formed entirely from plastics, in particular the aforementioned long-chain PPS. More particularly, such closed ring element may be formed as an integral, material homogeneous one-piece element made from plastic.

Such ring element forming the first spring device may include at least one pair of leaf springs forming a pair of legs of the ring element on opposite sides thereof, wherein such spring legs are connected by a pair of crosswise extending cross-bars integrally connected to said spring legs. More particularly, a pair of horizontal upper and lower cross-bars may connect two pairs of vertical leaf springs so as to together form a closed ring element.

Said cross-bars and said leaf springs may be formed from the same material, in particular the aforementioned long-chain PPS to form a one-piece element having a homogeneous material distribution without irregularities such as welding seams or adhesion joints.

The aforementioned cross-bars of the ring element may have a cross-sectional thickness and/or a volume considerably larger than the cross-sectional thickness and/or volume of the leaf spring elements, wherein said cross-bars may be configured to be substantially rigid and to resist vibrations and/or movements of the leaf spring legs substantially without deformations. In particular, the cross-bars' sections connecting pairs of neighboring leaf spring elements may be configured to form a rigid, block-like connector between the leaf springs to keep vibrations and movements of the leaf springs restricted to the leaf springs, thereby achieving precise control of the oscillation and avoiding undesired influence of the leaf springs onto each other.

The aforementioned cross-bars of the ring element may be provided with mounting structures for mounting the first and second drive components thereto. In particular, such mounting structures of the cross-bars may include press-fitting contours designed and adapted to the drive components' contours such that the drive components can be press-fitted onto the cross-bars of the ring element. Such press-fitting contour may include a recess in the plastic material of the cross-bars, into which recess a connector protrusion may be received in a press fit. For example, the cross-bar may include a substantial cylindrical hole into which a pin may be press-fitted. In the alternative, the cross-bars may include a press-fitting projection such as a press-fitting pin that can be press-fitted into a corresponding recess such as a substantially cylindrical hole of the drive components.

The aforementioned ring element may have a substantially rectangular shape comprising the aforementioned leaf springs and cross-bars connecting such leaf springs, wherein the leaf springs as well as the cross-bars may have a substantially straight, elongated contour, wherein the cross-bars may extend substantially perpendicular to the leaf springs, when considering the ring spring element in a non-deformed, neutral status.

The aforementioned leaf springs of the first spring device, when considering a cross-section thereof in a cross-sectional plane substantially parallel to the longitudinal axis of the leaf spring and parallel to the linear axis of movement of the drive unit, may have a contour the thickness of which increases towards the opposite ends of a leaf spring. More particularly, the leaf spring may have a minimum thickness in a center section from which the thickness continuously increases towards the opposite ends of the leaf spring.

So as to achieve an advantageous distribution of stresses within the spring element, the leaf springs may have a parabolic cross-sectional contour which may have a constriction or neck portion in a central section of the leaf spring from which constriction the thickness of the leaf spring increases in a parabolic way. More particularly, the leaf springs' cross-section may be defined by a pair of parabolas facing each other with their culmination points in a central region of the leaf spring forming the aforementioned constriction from which said pair of facing parabolas define the cross-sectional thickness increasing towards the leaf spring's opposite ends. Said parabolas defining the cross-section may be parabolas of a higher degree.

Due to such parabolic cross-sectional shape, the cross-sectional contour of the leaf spring is convex except the central restriction forming a transitional and/or connecting portion between the two parabolas, and may provide for a harmonic stress distribution.

Contrary to the leaf spring elements of the first spring device, the second spring device may have leaf springs having a substantially rectangular cross-section, when considering a cross-sectional plane substantially parallel to the longitudinal axis of the leaf spring's end parallel to the linear movement axis of the drive unit, and/or a thickness substantially constant along the longitudinal axis of the leaf springs.

The aforementioned leaf springs of the second spring device each may have a connection point to the mounting structure and a connection point to the drive unit, wherein the connection to the mounting structure may be positioned somewhere between the drive unit and the shaver head and the connection point to the drive unit may be positioned somewhere in a region of the drive unit opposite to the shaver head.

In addition or in the alternative, the aforementioned leaf springs of the second spring device may extend along substantially the entire side of the drive unit, wherein each of the leaf springs may extend along at least 50% or even 75% of the drive unit when considering the longitudinal extension thereof measured along the longitudinal axis of the handpiece.

According to a more generalized aspect, the second spring device may include a pair of spring elements supporting the drive unit relative to the mounting structure and defining a four point joint supporting the drive unit. The spring elements may form a spring bar linkage and/or a pendulum bearing for the drive unit.

The electric appliance for personal care may be an electric shaver including a handpiece formed by a shaver housing and a shaver head pivotably supported onto said handpiece about one or more pivot axes allowing for self-adaption of the shaver head to the contour of the skin to be shaved.

The shaver head may include only one cutter element, but the shaver head also may include two, three or more cutter elements. The shaver head may include further cutting or non-cutting functional elements such as a thermal element for cooling or heating a skin portion to be shaved, or a long-hair cutter, or fluid applicators to apply fluids such as deodorants, balms or lubricants onto the skin.

The transmission train for transmitting the drive power and movements of the electric linear motor to the at least one cutter element may have varying architectures and structures depending on the type of motor and the arrangement thereof. For example, the drive unit may include a reciprocating pin coupled to the aforementioned cutter element or undercutter directly or via an oscillation bridge allowing for pivoting of the cutter element relative to the angular orientation of the longitudinal axis of said pin.

These and other features become more apparent from the example shown in the drawings.

As can be seen from FIG. 1, shaver 1 may have a shaver housing 2 forming a handpiece for holding the shaver, which shaver housing 2 may have different shapes such as— roughly speaking—a substantially cylindrical shape or box shape or bone shape allowing for ergonomically grabbing and holding the shaver, wherein such shaver housing has a longitudinal shaver housing axis 25 due to the elongated shape of such housing, cf. FIG. 1.

On one end of the shaver housing 2, a shaver head 3 is attached to the shaver housing 2, wherein the shaver head 3 can be pivotably supported about a shaver head pivot axis x extending substantially perpendicular to the aforementioned longitudinal shaver housing axis and/or about an axis y perpendicular to said axis x. The shaver housing 2 may have a pair of support arms projecting from the shaver head end of the shaver housing 2 between which support arms a carrier structure of the shaver head 3, for example in terms of a shaver head frame, can be pivotably mounted about said shaver head pivot axis x.

As can be seen from FIG. 1, the shaver head 3 may include a pair of cutter elements 4, wherein only one or three or more of such cutter elements 4 may be provided. Such cutter elements 4 may form block-like undercutters with a plurality of shearing blades cooperating with a shear foil covering the respective cutter elements 4. The said cutter elements 4 may have an elongated shape with a longitudinal axis extending substantially parallel to the aforementioned shaver head pivot axis and/or substantially parallel to the cutting oscillation axis 8 along which the cutter elements 4 are driven in an oscillating manner.

Figure 2:
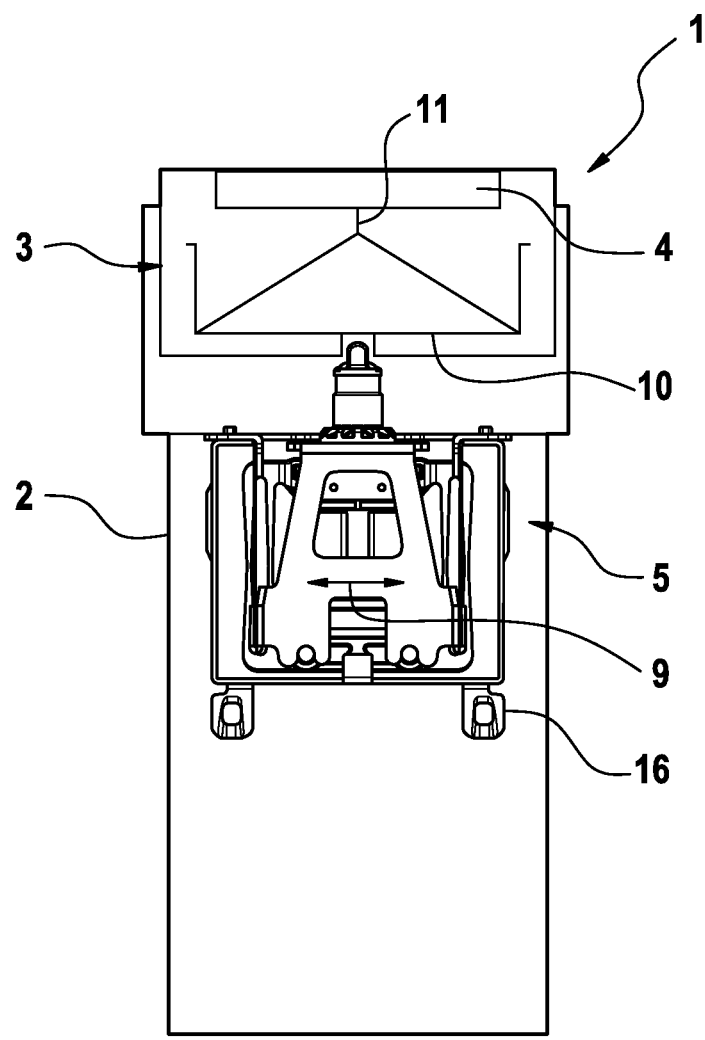
FIG. 2: is a plane view of a drive unit including magnetic-type drive components supported for linear oscillation and the surrounding mounting structure of the electric appliance of FIG. 1, FIG. 3: is a plane view of the drive unit of FIG. 2, showing a first spring device connecting the two magnetic drive components of the drive unit to each other and a second spring device connecting the drive unit to a mounting structure of the electric appliance.

As can be seen from FIG. 2, the drive unit 5 which may be received within the shaver housing 2 to drive the cutter elements 4 at the shaver head 3, is of the linear oscillating type and may include a first drive component 6 and a second drive component 7 which may oscillate relative to each other along an oscillation axis 9. Said first drive component 6 may form an active drive component coupled to the aforementioned cutter elements 4 by means of a transmitter 10 which may include a transmitter pin 11 extending from the drive unit 5 towards the shaver head 3. Such transmitter pin 11 may be directly coupled to the cutter elements 4, for example by means of a pivot bearing allowing for an additional transverse degree of freedom to compensate for pivoting of the shaver head 3. In the alternative, the transmitter 10 may include further transmission components such as a transmission bridge as it is per se known in the art.

As shown by FIG. 2, said second drive component 7 may include one or more oscillating, magnetic coils 12, whereas the first drive component 6 may include one or more permanent magnets 13, wherein, however, an opposite arrangement may be chosen with the coils 12 associated with the first drive component 6 and the permanent magnets 13 associated with the second drive component 7.

Said first and second drive components 6 and 7 may be supported movably relative to each other by means of a first spring device 14 allowing movements of the first and second drive components 6 and 7 along the drive unit's 5 oscillation axis 9 extending substantially parallel to the cutter oscillation axis 8. Said movements of the first and second drive components 6 and 7 relative to each other along the oscillation axis 9 can be considered as linear movement.

Said first spring device 14 may include one or more resonance springs arranged between the first and second drive components 6 and 7 to promote oscillation of the first and second drive components 6 and 7 relative to each other at natural frequency.

More particularly, said resonance springs of the first spring device 14 may be formed by one or more leaf springs 15 extending with their longitudinal axis substantially perpendicular to the aforementioned oscillation axis 9 of the drive unit and connecting the first and second drive components 6 and 7 to each other. More particularly, at least one pair of such leaf springs 15 may extend on opposite sides of said first and second drive components 6 and 7, wherein said leaf springs 15, at one end, are connected to the first drive component 6 and, at the opposite end, are connected to the second drive component 7.

The leaf springs 15 may bend to allow linear oscillation of the drive components 6 and 7 relative to each other. Thus, both drive components 6 and 7 may execute linear oscillation, wherein such oscillation is effected in a sort of reverse motion. When the first drive component 6 moves to the left, the second drive component 7 moves to the right and vice versa.

Figure 5:
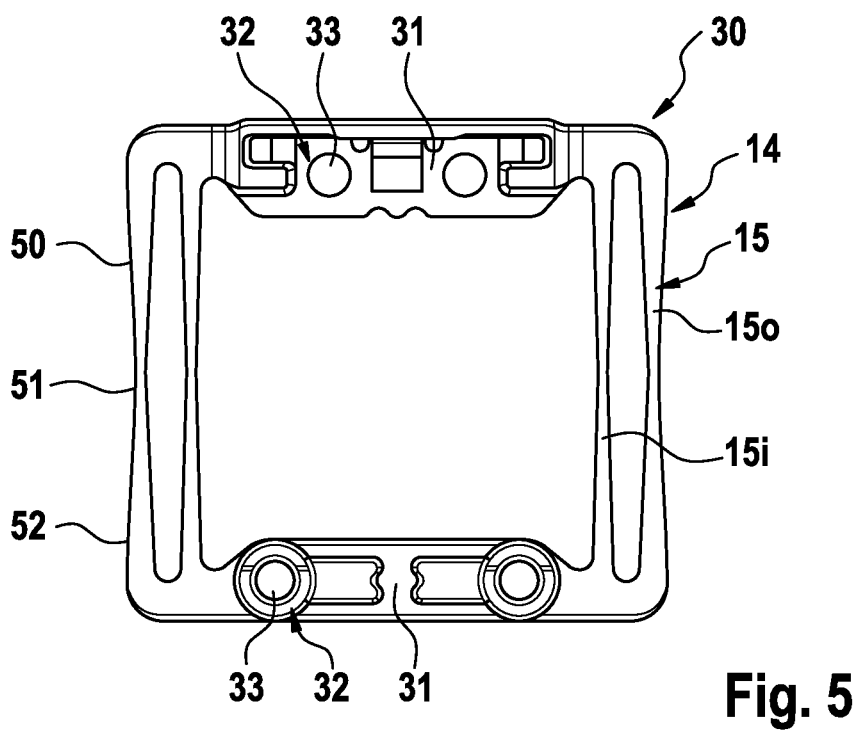
FIG. 5: a plane view of the first spring device of the drive unit of FIG. 4, and FIG. 6: a schematic illustration of the kinematics of the second spring device of the electric appliance of the preceding figures.

More particularly, as shown by FIG. 5, the first spring device 14 and the leaf springs 15 thereof may be formed by a ring-shaped spring element 30, wherein said leaf springs 15 form a pair of legs of such ring element 30 on opposite sides thereof. Said ring element 30 further may include a pair of cross-bars or cross elements 31 extending substantially perpendicular to the longitudinal axis of the leaf springs 15 and connecting said leaf springs 15 to each other. As can be seen from FIG. 5, said ring element 30 may have a substantially rectangular contour formed by a pair of cross-bars 31 spaced from each other and said leaf springs 15.

The aforementioned cross-bars 31 may be configured to be substantially rigid to resist stresses and forces caused by bending and oscillation of the leaf springs 15 substantially without deformations. As can be seen from FIG. 5, said cross-bars 31 may have a thickness and/or volume significantly larger than the thickness and/or volume of the leaf springs 15. For example, the cross-sectional area of the cross-bars 31 (when considering a cross-section perpendicular to the cross-bars' longitudinal extension) may multiple times larger than the cross-sectional area of the leaf springs 15 (when considering a cross-section in a plane substantially perpendicular to the leaf springs' longitudinal extension).

According to an advantageous aspect, said cross-bars 31 may be provided with a mounting structure and/or mounting contours 32 for mounting the drive components 6 and 7 thereto. Such mounting contours 32 may be adapted to mounting contours of said drive components 6 and 7 to snugly fit therewith and/or to achieve form-fitting of the cross-bars 31 with the drive components 6 and 7. More particularly, such mounting contours 32 may include a press-fitting contour to be press-fitted with a corresponding press-fitting contour at the drive components 6 and 7. For example, such press-fitting contour of the cross-bars 31 of the spring ring element 30 may include a press-fitting recess 33 such as a hole or a substantially cylindrical bore in the cross-bar 31 to be press-fitted with a corresponding press-fitting projection such as a press-fitting pin provided at the respective drive component 6 or 7. In addition or in the alternative, the cross-bars 31 may be provided with a press-fitting projection such as a press-fitting pin to be press-fitted with a press-fitting recess provided in the drive components 6 and 7.

Figure 3:
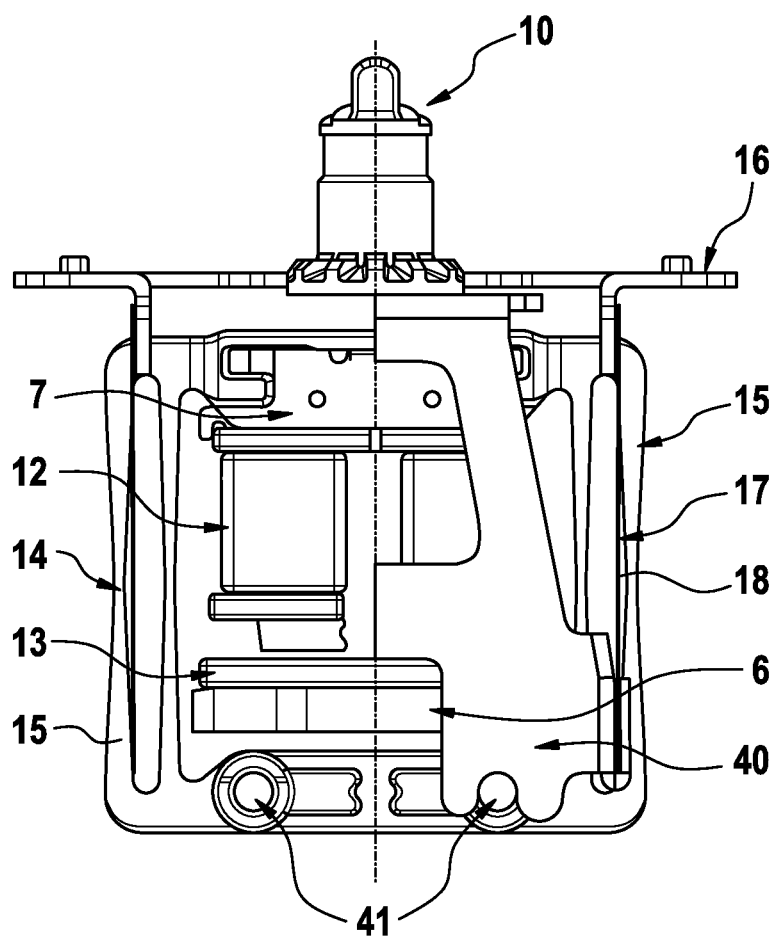

As can be seen from FIGS. 3 and 5, the aforementioned mounting contours 32 may include a plurality of press-fitting contours 33 on each cross-bar 31, wherein such press-fitting contours may be configured to have a fitting axis substantially perpendicular to the longitudinal extension of the cross-bars 31 and/or substantially perpendicular to the oscillation axis 9 of the drive unit 5 and/or substantially perpendicular to the plane defined by the ring element 30. Said fitting axis means the direction in which the press-fitting pin can be inserted into the corresponding press-fitting recess.

Basically, the drive components 6 and 7 could be fixed to said cross-bars 31 by means of other fixation means such as bolts, screws, rivets or adhesives. To reduce the number or parts and the mounting steps, the drive components 6 and 7 can be rigidly fixed to the cross-bars 31 of the spring ring element 30 by means of the aforementioned complementary press-fitting contours.

Said ring-shaped first spring device 14 including the cross-bars 31 and the leaf springs 15 may be formed from plastic as a one-piece element without inhomogeneities such as welding seams or adhesion irregularities. In particular, the entire first spring device 14 may be formed from long-chained PPS.

To give the leaf springs 15 sufficient spring stiffness, two pairs of leaf springs may be arranged in parallel to each other. More particularly, two or more leaf springs 15 may be provided on a left side of the first and second drive components 6 and 7 and two or more leaf springs 15 may be provided on a right side of said first and second drive components 6 and 7. Each pair of such lateral leaf springs 15$i$ and 15$o$ may extend substantially parallel to each other and crosswise to the oscillation axis, wherein an inner leaf spring 15$i$ and an outer leaf spring 15$o$ of such pair of leaf springs may have shapes and/or dimensions and/or contours different from each other to provide for different spring characteristics although such inner and outer leaf springs are formed from the same material.

More particularly, each of said leaf springs 15 may have a center section 15$c$ or middle section with a reduced thickness or cross-sectional area, wherein the leaf springs' 15 thickness and/or cross-sectional area may continuously increase from said center section 15$c$ towards the opposite ends of the leaf spring 15.

According to an aspect, at least one surface of said leaf spring 15 may have a parabolic contour so that said surface is convex. More particularly, said at least one surface may have a contour defined by a pair of parabolas 50, 52 facing each other with their culmination point, wherein in a transitional region around the culmination points facing each other the contour may deviate from said parabolic shape to form, for example, a neck-shaped connection 51 between said two parabolas.

According to a further aspect, inner and outer surfaces of the leaf springs 15 facing and facing away from the drive components 6 and 7 (in other words, left and right surfaces of the leaf springs 15 in FIG. 5) may have a parabolic contour defined by two parabolas having culmination points facing each other. Said parabolas defining the outer contours of the leaf springs 15 may be of higher degrees.

So as to give the inner and outer leaf springs 15$i$ and 15$o$ different spring characteristics, different parabolas may define the outer contours of said inner and outer leaf springs 15$i$ and 15$o$. In addition to such first spring device 14, a second spring device 17 may be provided for movably linking one of the first and second drive components 6 and 7 or another part of the drive unit 5 to a further structural part of the electric appliance, wherein such second spring device 17 may include a pair of leaf springs 18 that may form suspension springs for suspending the drive unit 5. More particularly, the drive unit 5 may be supported onto a mounting structure 16 by means of said second spring device 17.

Said mounting structure 16 may be a frame structure surrounding the drive unit 5, wherein such mounting frame may form a closed ring or rectangle surrounding the drive unit 5. Said mounting structure 16 may be rigidly fixed to the shaver housing 2, for example by means of mounting flanges, or may be held in the shaver housing 2 in a fixed position by means of suitable fixation means such as screws or latching means. Said mounting structure also may be formed directly by the shaver housing 2.

More particularly, such second spring device 17 may include a pair of leaf springs 18 which may extend substantially parallel to each other on opposite sides of the drive unit 5, said leaf springs 18 each having a connection point 29 to the first drive component 6 and a connection point 30 to the mounting structure 16. Such second set of leaf springs 18 forms a sort of bridge extending from the first drive component 6 to the mounting structure 16, thus forming a sort of pendulum bearing 27.

Figure 4:
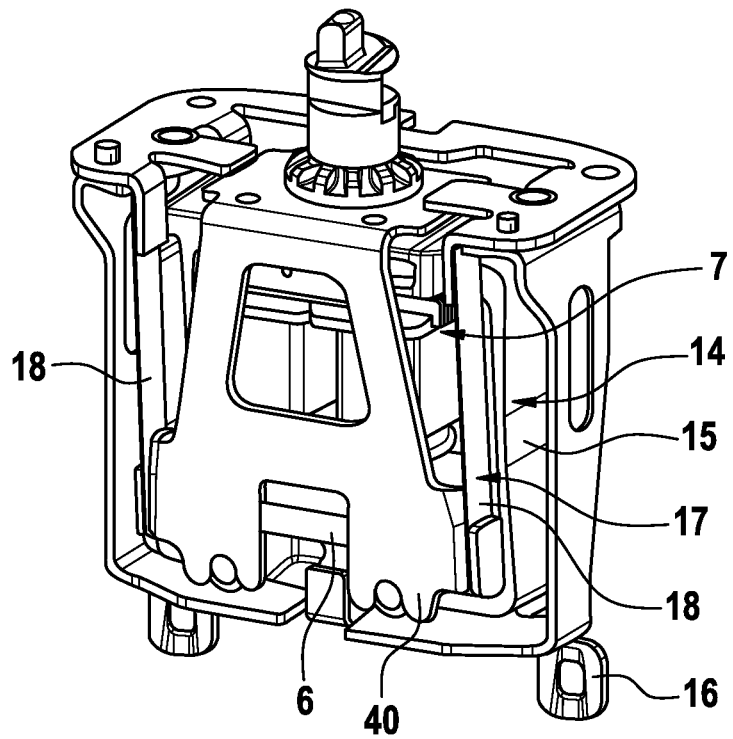
FIG. 4: a perspective view of the drive unit of FIG. 3, showing the first and second spring devices.

As can be seen from FIGS. 3 and 4, said leaf springs 18 of the second spring device 17 may extend substantially parallel to each other and/or substantially perpendicular to the oscillation axis 9 of the drive unit 5, at least when considering a neutral position of the drive unit 5 in an inactive status thereof.

Contrary to FIGS. 2 and 3, said leaf springs 18 of the second spring device 17 may extend at an acute angle when the drive unit 5 is in a rotary home position, i.e. the neutral position held by the leaf springs 28 of drive support 17 with the drive components 6 and 7 being inactive.

The leaf springs 18 of the second spring device 17 may be formed from metal, in particular steel.

Furthermore, said leaf springs 18 may have a substantially rectangular cross-section remaining substantially the same along the longitudinal extension of the leaf springs 18. In particular, said leaf springs 18 may be formed as thin, elongated steel plates.

Said metal leaf springs 18 of the second spring device 17 may have a thickness and/or cross-sectional area considerably smaller than the thickness and/or cross-sectional area of the leaf springs 15 of the first spring device 14.

According to a further aspect, the first and second spring devices 14 and 17 may be uncoupled from each other and/or separated from each other in terms of vibrational influencing. More particularly, a vibration barrier 40 may be provided between the first spring device 14 and the second spring device 17, wherein such vibration barrier 40 may be formed by a rigid element having sufficient dimensions to resist vibrations and/or stresses coming from one of the first and second spring devices. More particularly, such vibration barrier 40 may be configured in terms of rigidity and mass so as to not transmit oscillations of one of the first and second spring devices to another one of said first and second spring devices.

For example, such vibration barrier 40 may be formed by a rigid structural element which may be made of metal such as steel, which structural plate-like element may form a connection of the second spring device 17 to the first spring device 14 and/or one of the drive components 6 and 7. As can be seen from FIG. 3, such structural element forming the vibration barrier 40 may be rigidly connected to the crossbar 31 of the ring spring element 30 of the first spring device 14 by means of a pair of press-fitting pins 41.

Said vibration barrier 40 may be formed by a part of the transmitter 10 transmitting the linear movements of the drive unit 5 to the cutter element 4 of the shaver 1.

Due to the different materials from which the first spring device 14 and the second spring device 17 are made, sufficient stiffness of the spring structure can be achieved so as to allow for efficient transmission of the amplitudes to the cutter element 4, without sacrificing easy mounting and manufacturing. In particular, in comparison to a spring structure where both the first spring device and the second spring device is made from plastics, a spring stiffness and/or drive stiffness which is more than ten times higher can be achieved by means of using steel springs for the second spring device 17 in combination with plastic springs for the first spring device 14. Such considerably increased stiffness allowing for more efficient driving of the cutter element becomes apparent from FIG. 6 which is a simplified illustration of the structure of the second spring device 17 and the kinematics thereof. In said FIG. 6, the parameters and elements are indicated as follows:

$F_A$ force at point of output
F tensile force and/or compressive force onto a leaf spring
$s_A$ displacement at point of output
$s_{BF}$ change in length leaf spring
h height of point of output
B width of the oscillation bridge, distance of the oscillating arms
b width of the oscillating arms
t thickness of the oscillating arms
l length of the oscillating arms
$C_{Zug}$ tensile stiffness of an oscillating arm
$C_{SB}$ stiffness of oscillation bridge: spring rate during horizontal deflection of oscillation bridge (without fixation)
$C_A$ drive stiffness: resistance to deflection at point of output during horizontal fixation to point "2"
E elasticity module
A cross-sectional area of the oscillating arms formed by the second leaf springs 18

Figure 6:
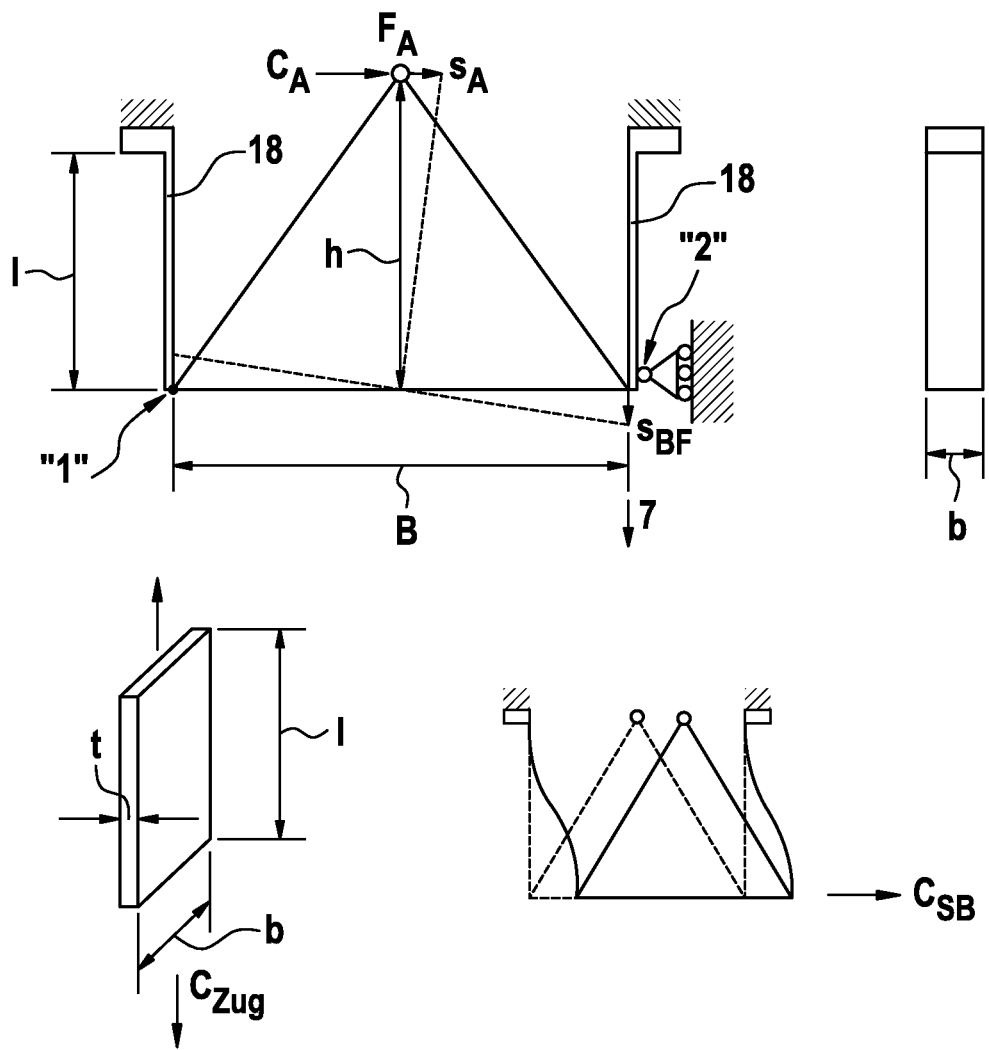

To approximate the kinematics of the structure shown in FIG. 6, the following assumptions are made:
  all elements of the structure except for the oscillating arms formed by the second leaf springs 18 are presumed to be ideally rigid
  oscillating arms have a continuous, rectangular cross section over the entire length
  oscillating arms are parallel
  oscillation bridge is not deflected The drive stiffness of the oscillation bridge can be derived from the tensile stiffness of the oscillating arms. It follows from the moment equilibrium at point "1" that:

$$\sum M_1 = 0 = F_A h - FB \Rightarrow F_A = F\frac{B}{h} \quad [1]$$

according to the intercept theorem it is true that:

$$\frac{s_A}{h} = \frac{s_{BF}}{B/2} \Rightarrow s_A = s_{BF}\frac{h}{B/2} \quad [2]$$

With respect to the tensile stiffness of the oscillating arms it is true that:

$$C_{Zug} = \frac{AE}{l} = \frac{tbE}{l} \quad [3]$$

With respect to the drive stiffness it is true that:

$$C_A = \frac{F_A}{s_A}$$

and together with equation [1] and [2].

$$C_A = \frac{1}{2}\left(\frac{B}{h}\right)^2 \frac{F}{S_{BF}} = \frac{1}{2}\left(\frac{B}{h}\right)^2 C_{Zug}$$

it follows from [3] in general that:

$$C_A = \frac{1}{2}\left(\frac{B}{h}\right)^2 \frac{tbE}{l} \quad [4]$$

With respect to the stiffness of the oscillation bridge $C_{SB}$, a (relatively small) determined value is preset in the linear motor so as to minimize the transmission of vibrations from the oscillating motor element onto the motor housing.

It is true that:

$$C_{SB} = 2\frac{bt^3 E}{l^3}$$

solved for t and inserted into [4] it follows that:

$$C_A = \frac{1}{2}\left(\frac{B}{h}\right)^2 \sqrt[3]{\frac{1}{2}C_{SB}(bE)^2} \quad [5]$$

In the case of a change from material 1 to material 2 it results from [5] that:

$$\frac{C_{A1}}{C_{A2}} = \left(\frac{E_1}{E_2}\right)^{\frac{2}{3}} \quad [6]$$

For steel this results in a 14.5 times higher drive stiffness when compared to PPS with equal stiffness of the oscillation bridge:

$$\frac{C_{A\,Stahl}}{C_{A\,PPS}} = \left(\frac{E_{Stahl}}{E_{PPS}}\right)^{\frac{2}{3}} = \left(\frac{210000}{3800}\right)^{\frac{2}{3}} = 14.5$$

The shaver head 3 may include further functional elements such as a long-hair cutter which may be arranged between the aforementioned pair of cutter elements 4.

The cutter elements 4 can be driven in an oscillating manner along cutting oscillation axis 8. In addition to such cutting movements, the cutting elements 4 can be pivotable and movable in directions transverse to said cutting oscillation axis 8.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electric appliance for personal care comprising an electric shaver, comprising a magnetic linear drive unit having first and second drive components connected to each other by a first spring device for substantially linear oscillation relative to each other and adapted to magnetically interact with each other, and a second spring device for movably linking the drive unit to a structural element of the electric appliance, wherein said first spring device includes one or more first spring elements made from plastic, whereas the second spring device includes one or more second spring elements made from metal.

2. The electric appliance according to claim 1, wherein said one or more spring elements of the first spring device form a plastic resonance spring device helping the first and second drive components to oscillate at a natural frequency, and said one or more spring elements of the second spring device form a steel suspension spring device connecting said first or second drive component of the drive unit or a further part of the drive unit to a mounting structure.

3. The electric appliance according to claim 1, wherein said one or more spring elements of the first spring device and said one or more spring elements of the second spring device are formed as leaf springs with a longitudinal axis thereof extending crosswise to an oscillation axis of the drive unit.

4. The electric appliance according to claim 1, wherein the first spring device made of plastic is configured to have a spring stiffness being at least twice as large as the spring stiffness of the second spring device made of metal.

5. The electric appliance according to claim 1, wherein the first spring device includes a higher number of spring elements than the second spring device.

6. The electric appliance according to claim 5, wherein the second spring device comprises two metal leaf springs and the first spring device includes at least four plastic leaf springs.

7. The electric appliance according to claim 1, wherein the first spring device is decoupled from the second spring device in terms of vibrations and oscillations of the spring elements thereof by a vibration barrier arranged between said first and second spring devices.

8. The electric appliance according to claim 7, wherein said vibration barrier is formed by a rigid part of a drive transmitter structure for transmitting the oscillation of the drive unit to an appliance tool, wherein said rigid part of the transmitter structure connects the second spring device rigidly to one of the first and second drive components.

9. The electric appliance according to claim 1, wherein the first spring device is made of long-chained polyphenylene sulfide PPS.

10. The electric appliance according to claim 1, wherein said first spring device is formed by a closed ring element including at least one pair of leaf springs and a pair of cross-bars extending crosswise to said leaf springs and connecting said leaf springs to each other.

11. The electric appliance according to claim 10, wherein said cross-bars include mounting contours adapted to form-fit with mounting contours of the first and second drive components.

12. The electric appliance according to claim 10, wherein said cross-bars include mounting contours adapted to press-fit with mounting contours of the first and second drive components.

13. The electric appliance according to claim 1, wherein said first spring device includes leaf springs having outer surfaces with parabolic contours.

14. The electric appliance according to claim 1, wherein said second spring device includes leaf springs having a cross-section substantially the same along the longitudinal extension of said leaf springs, wherein a cross-sectional area of said leaf springs is smaller than the cross-sectional area of the leaf springs of the first spring device.

15. The electric appliance according to claim 1, wherein the second spring device includes a pair of leaf springs defining a four point joint supporting said drive unit, said pair of leaf springs are arranged on opposite sides of the drive unit and define, with their longitudinal axes in a neutral position of the drive unit with the drive components being inactive, a pair of straight lines parallel with each other or a V-configuration with an angle of inclination between the leaf springs ranging between about 2×1° to about 2×10°.

16. The electric appliance according to claim 1, wherein said first and second drive components are connected to each other by a pendulum bearing allowing for linear oscillation of said first and second drive components relative to each other, wherein said pendulum bearing is formed by said first spring device.

17. The electric appliance according to claim 1, wherein at least a portion of one of the one or more second spring elements is located between an adjacent pair of the one or more first spring elements.

* * * * *